Dec. 18, 1928.  1,695,878
A. CALLSEN
INDUCTION METER
Filed May 20, 1926
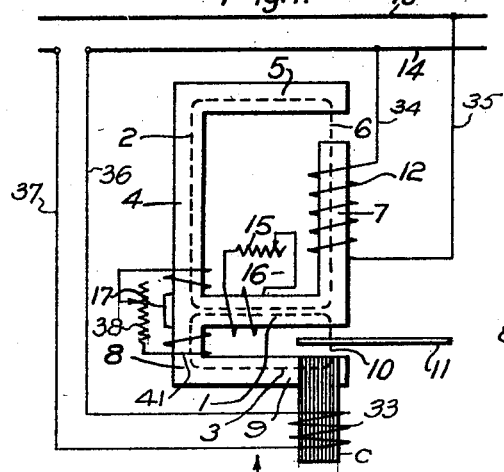
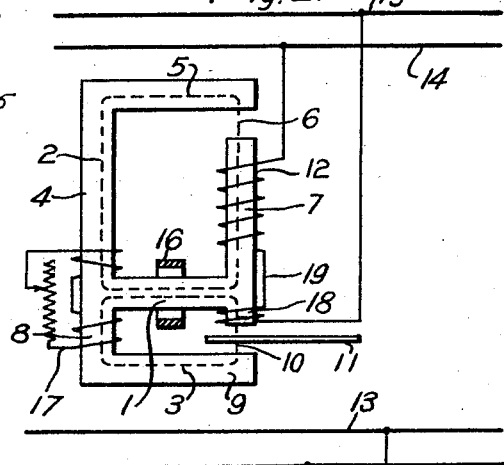
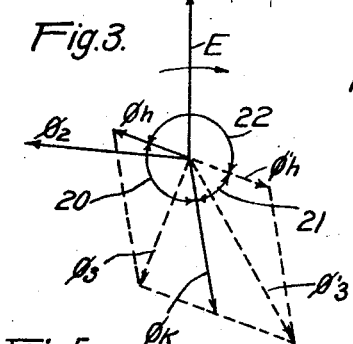
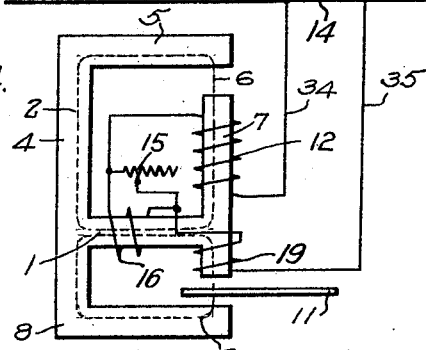
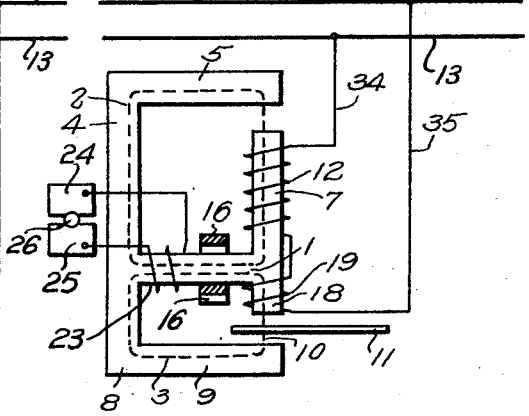
WITNESSES:
*A. Schiefelbein.*
*B. R. King.*
INVENTOR
*Albert Callsen.*
BY
*Wesley G. Carr*
ATTORNEY Patented Dec. 18, 1928.

1,695,878

UNITED STATES PATENT OFFICE.

ALBERT CALLSEN, OF NUREMBERG, GERMANY, ASSIGNOR TO WESTINGHOUSE ELECTRIC & MANUFACTURING COMPANY, A CORPORATION OF PENNSYLVANIA.

INDUCTION METER.

Application filed May 20, 1926, Serial No. 110,346, and in Germany May 22, 1925.

My invention relates to alternating-current induction meters and it has for an object to provide a voltage magnet in such a meter having means associated therewith for adjusting the phase displacement of the voltage flux, even at low frequencies, without making its energy requirements too great.

The armature in induction meters is actuated by the cooperation of a flux from a voltage magnet energized in accordance with the line voltage, and by a flux from a current magnet energized in accordance with the load current. Such driving magnetic fields of the two magnets should have a predetermined phase displacement with respect to each other, in order that the meter might measure the various loads properly. When such a meter is used for measuring the electrical power of a circuit, there must be a phase displacement of substantially 90° between the voltage magnetic field and the line voltage, and when the meter is to be used for measuring the reactive energy, there must be a phase displacement of 180°, or 0°, under the assumption that the field produced by the current is in phase therewith. Heretofore it has been difficult to produce a displacement of 90° at the lower frequencies, and it is difficult to produce a displacement of 0° or of 180° at the normal frequencies.

In practicing my invention, I provide a voltage core for the meter with divisions such that the magnetic circuit is divided into two parallel paths, provided with air gaps, the fluxes of the said paths being coupled with each other by means of one or more short-circuited windings. To conform with the requirements of my invention such a winding may be mounted either on an undivided part of the magnetic circuit, or in the form of two series-connected partial windings on divisions of the magnetic circuit, or both forms of windings may be used in the same magnet. One of the divisions of the magnet carries the voltage winding, and the other receives in its air gap the disc armature.

The main voltage winding induces a current in each of the short-circuited windings, which may be reduced by a resistor constituted by the resistance of the winding itself, or by an auxiliary resistor connected in the circuit at any place. This permits of varying the phase as well as the magnitude of the flux of the voltage magnet. In order to facilitate any change in the phase displacement between the voltage flux and the voltage, I mount on that part of the magnetic circuit that contains the active air gap, an auxiliary exciter winding and connect such winding with an exciter winding on the other part, such auxiliary winding having either more or less turns than the exciter winding.

The phase angle between the line voltage and the voltage flux may be adjusted in accordance with my invention within a range that is greater than 90°, either by varying the resistances, or by varying the number of turns of either the short-circuited windings, or of the auxiliary winding. By reversing the auxiliary winding, the range may be made greater than 180°. The said 180° can be obtained easily by reversing the main voltage winding.

Heretofore, devices associated with the voltage magnets permitted a variation in the phase angle between the exciter voltage and the voltage flux within a relatively limited range only. Even the use of heavy copper shunts on the parts of the magnetic circuit does not make it possible to increase the range, aside from the fact that their energy loss sometimes becomes very large. It would become necessary to use a displacement between the current and the flux generated thereby, to obtain the desired adjustment.

The following is a description of my invention, together with the apparatus with which it may be practiced, reference being had to the accompanying drawings, in which:

Fig. 1 is a diagrammatic view of an electromagnet embodying my invention,

Figs. 2 and 4 are similar views of modifications,

Fig. 3 is a vector diagram of the fluxes in the two parts of the magnetic circuits of Figs. 1 and 2, Figs. 5 and 6 are views of further modifications of the electromagnet of Fig. 1.

Referring to the drawings, a voltage core and a current core C of the usual laminated construction are disposed with respect to each other in such manner that cooperating fluxes induced in them by windings 12 and 33, respectively, actuate an aluminum or copper armature 11 in a well-known manner. The armature 11 may be arranged to drive any type of recording or integrating device (not shown for the sake of clearness of illustration).

The voltage winding 12 may be energized by a current proportional to the electromotive force between two conductors 13 and 14 of an electrical power circuit by conductors 34 and 35 in parallel-circuit relation with the latter. The current winding 33 may be energized in accordance with the current traversing the conductor 14 by conductors 36 and 37 in electrical series relation therewith.

My invention resides particularly in means for adjusting the phase displacement of the voltage flux traversing the disc 11, that cooperates with the flux emanating from the current core C to produce a turning movement of the disc 11. To this end, I provide a voltage magnet or core V with a plurality of flux paths 2 and 3, having air gaps 6 and 10, respectively, and a common path 1. The flux path 2 comprises the common flux path leg 1, legs 4 and 5, air gap 6 and leg 7. The flux path 3 comprises the common flux path leg 1, legs 8 and 9 and the air gap 10.

Both of the flux paths 2 and 3 have a flux that is induced in them by the voltage winding 12. However, the flux induced in the path 3 is modified in phase position with respect to the flux in the path 2 by means of a winding 17 that has a portion of its turns on the leg 4 and a portion of its turns on the leg 8. A variable resistor 38 is placed preferably in series-circuit relation with the winding 17 for varying the resistance of the latter for purposes that will be more fully set forth hereinafter. The flux traversing the path 2 may be modified with respect to the voltage across the conductors 13 and 14 by a winding 16 on the leg 1. The winding 16 is also preferably provided with an adjustable resistor 15 for varying the resistance of its circuit.

The lengths of the air gaps 6 and 10 are preferably of such magnitude with respect to each other that the effect of the adjustable resistors is distributed over the greatest feasible range. The air gap 6, that may comprise any substantially non-magnetic material, such as brass, as well as air, causes the flux traversing the path 2 to lag behind the voltage across the conductors 13 and 14. Such lagging of the flux traversing the flux path 2 is augmented by the winding 16 that has a current generated therein by the flux, that tends to oppose the flux, in a usual and well-known manner, hence the flux traversing the path 2 lags the voltage across the conductors 13 and 14 by almost 90°. In addition to this, the amount of lag of such flux with respect to such voltage may be varied by changing the resistance of the resistor 15 in the winding 16. The resistor 15 performs the above function by changing the magnitude of the current generated therein and hence the reluctance of the path 2 in a manner well known to those skilled in the art.

The flux in the path 3, as has been mentioned before, consists primarily of the flux induced by the magnetomotive force of the secondary ampere turns of the windings 16 and 17. The back electromotive force set up by the flux in the path 2 in the winding 16 sets up a current therein that induces a flux in the leg 1 that traverses the path 3. Such flux is increased in magnitude by the winding 17 having a portion 40 on the leg 4 and a portion 41 on the leg 8 that are wound with respect to each other in such manner that a current generated in the portion 40 traverses the portion 41 and induces a flux in the path 3 in the same direction as the flux induced by the secondary ampere turns of the winding 16. Practically or substantially all of the flux across the air gap 10 traverses the path 3, since the low reluctance of the leg 1 causes most of the flux to follow the path through itself. Thus, a very accurate control of both the magnitude and phase position of the flux traversing the path 3 may be obtained by adjusting the resistors 15 and 38, respectively, of the coils 16 and 17. The flux traversing the path 3 may be made to lag the voltage of the winding 12 by exactly 90° with the aid of windings 16 and 17.

The secondary ampere turns of the windings 16 and 17 constitute mainly the magnetomotive force in the part 3 of the magnetic path. Only a negligible portion of the flux lines surrounded by the winding 12 traverse the gap 10, as this gap is practically short-circuited, relatively to these lines, by the leg 1.

The exciter winding 16 may be replaced by a copper ring, as shown in Fig. 2, and the leg 7 may be provided with a projecting portion 18 extending toward the disc 11. An auxiliary winding 19 may be located thereon and connected in series with the winding 12, the ampere turns of the winding 19 being added to that of the windings 16 and 17.

Fig. 3 is a vector diagram of the active fluxes for the paths 2 and 3 in Figs. 1 and 2. $\varnothing_2$ represents the flux for the path 2, and $\varnothing_3$ represents the flux for the path 3. The flux $\varnothing_s$ comprises the components $\varnothing_k$ and $\varnothing_h$. The component $\varnothing_k$ arises by virtue of the short-circuited windings 16 and 17. The component $\varnothing_h$ rises by virtue of the auxiliary winding 19. The components of the flux $\varnothing_2$ generated by the windings 12 and modified by the windings 16 and 17, are not shown, in order not to complicate the drawing. E represents the line voltage vector. The component $\varnothing_h$ generated by the winding 19 alone, lags behind the voltage E less than 90°, and it has about the same position as to phase as the exciter current in the winding 12. The flux $\varnothing_2$ lags behind the voltage by a larger angle as it is caused by the co-operation of the exciter winding with the secondary currents in the windings 16 and 17. These secondary currents lag behind the voltage by more than 180°. The component $\phi_k$ of the flux due to these currents in windings 16 and 17 is in phase therewith.

As the driving flux $\phi_3$ comprises the components $\phi_h$ and $\phi_k$, which do not exist in reality, it lags behind the voltage by more than 90°. It can be made to approach the component $\phi_h$ by reducing the component $\phi_k$, and it can be made to approach the component $\phi_k$ by reducing the component $\phi_h$ in phase. There is, therefore, no difficulty in adjusting the vector of the flux $\phi_3$ within the angular space 20.

A reversal of the winding 19 effects a movement of the flux component produced thereby into the position $\phi_h^1$, which is indicated by the broken lines in Fig. 3. The active flux itself is then in the position $\phi_3^1$, and it may be moved within the angular range 21 by varying the components $\phi_k$ and $\phi_h^1$.

The sum of the angles 20 and 21 equals 180°. Therefore the vector of the driving flux may be brought into the range of the angle 22, by reversing the voltage magnet with respect to the current magnet, which may be effected by reversing the exciter winding 12.

Nothing is changed in the essence of my invention if the short-circuited winding 16 is, for example, connected in the manner shown in Fig. 4, with the exciter winding 12 and the auxiliary winding 19.

The voltage magnet shown in Fig. 5 corresponds in its action to the magnet of Fig. 2, and distinguishes therefrom only in that each part of the magnetic circuit is divided into two halves, $2^a$, $2^b$ and $3^a$, $3^b$.

In special meters, such as standard calibrating meters, it is desirable to be able to change from a meter measuring active energy to one measuring reactive energy, or into a meter with special constants. A switch may be provided for this purpose in one or more of the secondary windings, by means of which the phase relation between the flux and the voltage may be varied. As shown in Fig. 6, the two ends of the winding 23 may be connected to the contact members 24, 25, which may be connected to each other by a plug 26. The windings and the air gap may be so designed that a phase displacement of 90° is obtained with the winding 23 open, and a displacement of 180° when the winding 23 is short-circuited.

While it is conceded that means for adjusting the phase displacement of meters are known and used, my invention accomplishes results not realized in the prior art in that it provides extremely simple and economic means for adjusting the phase displacement over the entire range of adjustment with comparatively small energy losses. This makes possible the accurate metering of loads even at the lower frequencies.

Many changes may be made in my invention without departing from the spirit and scope of the same as set forth in the appended claims.

I claim as my invention:

1. In an alternating current meter, a voltage magnet for adjusting the phase displacement between the line voltage and the voltage flux; comprising a magnetic circuit divided into two paths one of which is provided with an active air gap for a disc armature, the other of which carries a voltage exciter winding and a winding of variable impedance coupling the fluxes of the said paths of the magnetic circuit.

2. In an alternating current meter, a voltage magnet adjustable for any phase displacement between the line voltage and the voltage flux, comprising a magnetic circuit divided into two parallel paths, one of which is provided with an air gap and a voltage exciter winding, the other of which is provided with an active air gap for a disc armature, a winding of variable impedance having parts connected in series circuit relation, a part being carried by each of said two parallel magnetic circuits, and a winding of variable impedance carried by said first named magnetic circuit.

3. In an induction meter, the combination with a voltage core having a plurality of flux paths, of means for inducing a flux in one of said flux paths, means including a winding embracing both of said flux paths for inducing a flux in an other of said flux paths, and means including a variable resistor in circuit relation with said winding for affecting the induced flux in said other path.

4. In an induction meter, the combination with a voltage core having a plurality of flux paths, each intercepted by substantially non-magnetic areas, of means for inducing a flux in one of said paths, means including a plurality of windings embracing said flux paths for inducing a flux in an other of said flux paths, and means including a variable resistor associated with one of said windings for affecting the phase of the induced flux in the said other path.

In testimony whereof, I have hereunto subscribed my name this 29th day of April, 1926.

ALBERT CALLSEN.